United States Patent
Bellers et al.

(10) Patent No.: US 8,508,659 B2
(45) Date of Patent: Aug. 13, 2013

(54) SYSTEM AND METHOD FOR FRAME RATE CONVERSION USING MULTI-RESOLUTION TEMPORAL INTERPOLATION

(75) Inventors: Erwin Ben Bellers, Fremont, CA (US); Thijs Thomas Withaar, Eindhoven (NL)

(73) Assignee: NXP B.V., Eindhoven (NL)

( * ) Notice: Subject to any disclaimer, the term of this patent is extended or adjusted under 35 U.S.C. 154(b) by 766 days.

(21) Appl. No.: 12/547,827

(22) Filed: Aug. 26, 2009

(65) Prior Publication Data
US 2011/0050991 A1    Mar. 3, 2011

(51) Int. Cl.
*H04N 7/01*    (2006.01)

(52) U.S. Cl.
USPC .......................................... 348/441

(58) Field of Classification Search
USPC .............. 348/441, 443, 447, 449, 451, 452, 348/458, 459; 375/240.16, 240.12, 240.01
See application file for complete search history.

(56) References Cited

U.S. PATENT DOCUMENTS

| | | | | |
|---|---|---|---|---|
| 4,864,393 A | * | 9/1989 | Harradine et al. | 348/699 |
| 4,864,394 A | * | 9/1989 | Gillard | 348/699 |
| 5,654,761 A | * | 8/1997 | Jung | 375/240.16 |
| 6,208,692 B1 | * | 3/2001 | Song et al. | 375/240.19 |
| 7,630,566 B2 | * | 12/2009 | MacInnis et al. | 382/238 |
| 7,660,471 B2 | * | 2/2010 | Bjontegaard | 382/232 |
| 7,847,823 B2 | * | 12/2010 | Habuka et al. | 348/208.4 |
| 7,916,791 B2 | * | 3/2011 | Lu | 375/240.16 |
| 2007/0230578 A1 | * | 10/2007 | Shi et al. | 375/240.16 |
| 2010/0226435 A1 | * | 9/2010 | Riemens et al. | 375/240.16 |
| 2010/0266041 A1 | * | 10/2010 | Gish et al. | 375/240.15 |

OTHER PUBLICATIONS

R.B. Wittebrood, G. De Haan and R. Lodder; "Tackling Occlusion in Scan Rate Conversion Systems"; Digest of the ICCE '03; Jun. 2003; p. 344-345.

G. De Haan, P.W.A.C Biezen, and O.A. Ojo; "An Evolutionary Architecture for Motion-Compensated 100 HZ Television"; IEEE Tr. on Circuits and Systems for Video Technology; vol. 5; Jun. 1995; p. 207-217.

* cited by examiner

Primary Examiner — Paulos M Natnael (57) ABSTRACT

A system and method for frame rate conversion using multi-resolution temporal interpolation utilizes motion estimation on input images to produce at least one motion vector and temporal interpolation on the input images in at least one spatial resolution that is determined by a characteristic of the at least one motion vector.

19 Claims, 7 Drawing Sheets

SYSTEM AND METHOD FOR FRAME RATE CONVERSION USING MULTI-RESOLUTION TEMPORAL INTERPOLATION

Embodiments of the invention relate generally to video processing systems and methods and, more particularly, to a system and method for frame rate conversion using multi-resolution temporal interpolation.

Frame rate conversion techniques, such as motion-compensated (MC) up-conversion (UPC) techniques, are applied to input images to generate a higher frame rate, for example, to enable viewing video on a 120 Hz liquid crystal display (LCD) television panel, or to remove judder from the input images. MC-UPC techniques can restore natural motion portrayal within a video stream and reduce motion blur on an LCD television panel. However, in practical applications, the range of motion that can be compensated for by MC-UPC techniques is limited by the implementation cost. Because a higher range of motion requires an increase in the implementation cost, the range of motion that can be compensated for by MC-UPC techniques tends to be rather limited in practical applications. If the range of motion exceeds the effective limit of MC-UPC techniques, artifacts may appear or a fall-back to a less favorable compensation technique may be necessary. Thus, there is a need for a system and method for frame rate conversion that can significantly increase the range of motion that can be compensated for without a significant increase in the implementation cost.

A system and method for frame rate conversion using multi-resolution temporal interpolation utilizes motion estimation on input images to produce at least one motion vector and temporal interpolation on the input images in at least one spatial resolution that is determined by a characteristic of the at least one motion vector. Because low resolution input images occupy less space in a cache than full resolution input images, performing motion compensated temporal interpolation on the input images on various resolution levels can either increase the maximal motion vector that can be stored in a given cache or decrease the cache size that is required for storing a given motion vector. As a result, the system and method for frame rate conversion using multi-resolution temporal interpolation can reduce artifacts and increase the range of motion that can be compensated for by MC-UPC techniques without a significant increase of the implementation cost.

In an embodiment, a method for frame rate conversion involves obtaining input images, where the input images correspond to different instances in time, performing motion estimation on the input images to produce a motion vector, and performing temporal interpolation on the input images in a spatial resolution that is determined by a characteristic of the motion vector to generate an interpolated image.

In an embodiment, a system for frame rate conversion includes a motion estimator and a motion compensated temporal interpolator. The motion estimator is configured to perform motion estimation on input images to generate a motion vector, where the input images correspond to different instances in time. The motion compensated temporal interpolator is configured to perform motion compensated temporal interpolation on the input images using the motion vector to generate interpolated images. The motion compensated temporal interpolator includes a first upconverter, a downscaler, a second upconverter, an upscaler, and a switch. The first upconverter is configured to perform temporal interpolation on the input images in a full spatial resolution using the motion vector to generate a first interpolated image. The downscaler is configured to downscale the input images from the full spatial resolution into a downscaled spatial resolution. The second upconverter is configured to perform temporal interpolation on the input images in the downscaled spatial resolution using the motion vector to generate a second interpolated image. The upscaler is configured to upscale the second interpolated image into a processed image. The switch is configured to select the first interpolated image or the processed image as an output image based on a characteristic of the motion vector.

In an embodiment, a system for frame rate conversion includes a motion estimator and a motion compensated temporal interpolator. The motion estimator is configured to perform motion estimation on input images to generate a motion vector, where the input images correspond to different instances in time. The motion compensated temporal interpolator is configured to perform motion compensated temporal interpolation on the input images using the motion vector to generate interpolated images. The motion compensated temporal interpolator includes a first upconverter, a downscaler, a second upconverter, an upscaler, and a mixer. The first upconverter is configured to perform temporal interpolation on the input images in a full spatial resolution using the motion vector to generate a first interpolated image. The downscaler is configured to downscale the input images from the full spatial resolution into a downscaled spatial resolution. The second upconverter is configured to perform temporal interpolation on the input images in the downscaled spatial resolution using the motion vector to generate a second interpolated image. The upscaler is configured to upscale the second interpolated image into a processed image. The mixer is configured to process the first interpolated image and the processed image to generate an output image based on a characteristic of the motion vector.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

Figure 1:
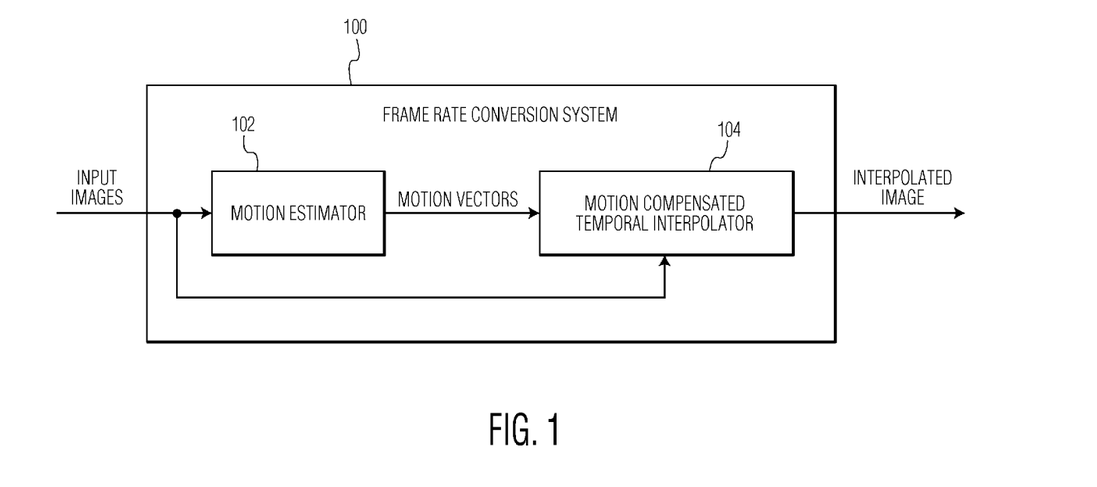
FIG. 1 is a schematic block diagram of a frame rate conversion system that uses multi-resolution temporal interpolation in accordance with an embodiment of the invention.

FIG. 1 is a schematic block diagram of a frame rate conversion system 100 that uses multi-resolution temporal interpolation in accordance with an embodiment of the invention. As shown in FIG. 1, the frame rate conversion system includes a motion estimator 102 and a motion compensated temporal interpolator 104. In some embodiments, the frame rate conversion system includes an input image buffer (not shown) to buffer video data and to reconstruct input images from received video data. The system of FIG. 1 can be implemented in, for example, video processing servers, televisions, set-top boxes, Digital Versatile/Video Disc (DVD) players, and blu-ray players.

In the embodiment of FIG. 1, the motion estimator 102 is configured to perform motion estimation on input images to generate at least one motion vector, where the input images correspond to different instances in time. In an embodiment, the motion estimator is configured to perform motion estimation on two input images to generate at least one motion vector. For example, the motion estimator performs motion estimation on a previous image and a current image to generate at least one motion vector. In another embodiment, the motion estimator is configured to perform motion estimation on more than two input images to generate at least one motion vector. For example, the motion estimator performs motion estimation on a previous image, a current image, and a next image to generate at least one motion vector. In another example, the motion estimator performs motion estimation on a pre-previous image, a previous image, and a current image to generate at least one motion vector.

In the embodiment of FIG. 1, the motion compensated temporal interpolator 104 is configured to perform motion compensated temporal interpolation on the input images using the at least one motion vector generated by the motion estimator 102. The motion compensated temporal interpolation is performed on the input images in at least one spatial resolution that is determined by at least one characteristic of the at least one motion vector to generate at least one interpolated image. In an embodiment, the motion compensated temporal interpolation may be performed on a single pixel from each of the input images in at least one spatial resolution that is determined by at least one characteristic of the at least one motion vector to generate a single pixel of the at least one interpolated image. In another embodiment, the motion compensated temporal interpolation may be performed on a group of pixels from each of the input images in at least one spatial resolution that is determined by at least one characteristic of the at least one motion vector to generate a group of pixels of the at least one interpolated image. In another embodiment, the motion compensated temporal interpolation may be performed on all the pixels of each of the input images in at least one spatial resolution that is determined by at least one characteristic of the at least one motion vector to generate all of the pixels of the at least one interpolated image. In an embodiment, the motion compensated temporal interpolator performs motion compensated temporal interpolation on the input images on hierarchical spatial resolution levels that include a full spatial resolution and at least one downscaled spatial resolution.

The characteristic of a motion vector may correspond to a velocity of motion reflected by a group of pixels in one image of the input images and a corresponding group of pixels in another image of the input images. Specifically, when the velocity of motion is increasing, the characteristic of a motion vector is also increasing and when the velocity of motion is decreasing, the characteristic of a motion vector is also decreasing. The characteristic of a motion vector may be related to a size of the motion vector. For example, the characteristic of the motion vector is the vertical range of the motion vector, which is usually identical to the absolute value of the vertical part of the motion vector. If the whole scene of the input images moves in a certain direction, a "tilt" or an "offset" can applied to a whole frame and the vertical range of the motion vector is equal to the addition of the vertical part of the motion vector and the "tilt" or the "offset."

Input images are typically stored in a background memory (not shown). During temporal interpolation, a part of the input images is loaded into a local cache (not shown) of the motion compensated temporal interpolator 104 and then used for temporal interpolation. If pixels of the input images for temporal interpolation are not present in the local cache, the required pixels of the input images have to be read into the local cache, which will delay the temporal interpolation process. Without a complete set of the required pixels, a less than optimal interpolation will be performed. Because low spatial resolution input images occupy less space in the local cache than full spatial resolution input images, performing motion compensated temporal interpolation on the input images on various resolution levels can either increase the maximal motion vector characteristic that can be stored in a given cache or decrease the cache size that is required for storing a given motion vector characteristic. For example, some pixels of the input images in a full resolution, which can be used to perform full resolution image upconversion, also referred to as regular upconversion, as well some pixels of the input images in a lower resolution, which can be used to perform low resolution image upconversion, are stored in a local cache. In another example, pixels of the input images in more than two resolutions or in other resolutions are stored in a local cache.

Figure 2:
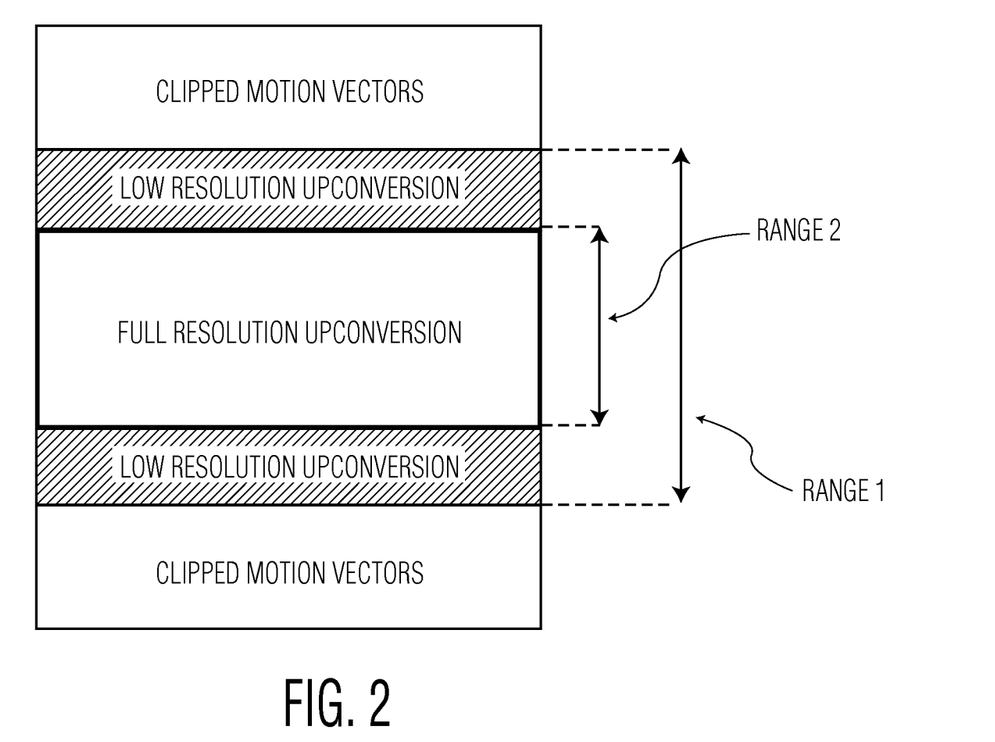
FIG. 2 depicts a temporal interpolation scheme that can be used in the motion compensated temporal interpolator of FIG. 1.

FIG. 2 depicts a temporal interpolation scheme that can be used in the motion compensated temporal interpolator 104 of FIG. 1. Temporal interpolation is performed on the input images using a motion vector. When the vertical part of the motion vector is outside of a range "range1," not all of the corresponding pixels of the input images for temporal interpolation are stored in the local cache. As a result, the motion vector is clipped and temporal interpolation is performed on the input images using the clipped motion vector. When the vertical part of a motion vector is within "range1," the corresponding pixels of the input images for temporal interpolation are stored in a local cache. Specifically, when the vertical part of the motion vector falls within a range "range2," temporal interpolation is performed using the pixels of input images in the full resolution. When the vertical part of the motion vector is between "range1" and "range2," temporal interpolation is performed using the pixels of the input images in the lower resolution.

Because low resolution input images occupy less space in the local cache than full resolution input images, the temporal interpolation scheme described with respect to FIG. 2 can either increase the maximal motion vector vertical range that can be stored in a given cache or decrease the cache size that is required to store a given motion vector vertical range. Thus, performing temporal interpolation on the input images in multiple resolutions can reduce artifacts. Using the input images in a low resolution introduces a loss of detail for fast moving objects, while motion vector clipping causes double images effect. However, because fast moving objects in a video stream are often blurred due to the camera integration time, the loss of detail that is introduced by using the input images in a low resolution is limited. In particular, because the highest frequency components of large motion vectors are already filtered out due to the camera integration time and downscaled input images likely contain the same or similar frequency content, higher frequency components may not be retained in the downscaled input images. Thus, when temporal interpolation is performed on the input images in multiple spatial resolutions, the motion of the interpolated images is smooth for a large range of motion vectors. As a result, the frame rate conversion system 100 of FIG. 1 can significantly increase the range of motion that can be compensated for by MC-UPC techniques, or even eliminate the effective limit of MC-UPC techniques, without a significant increase of the cost to implement the frame rate conversion system.

Figure 3:
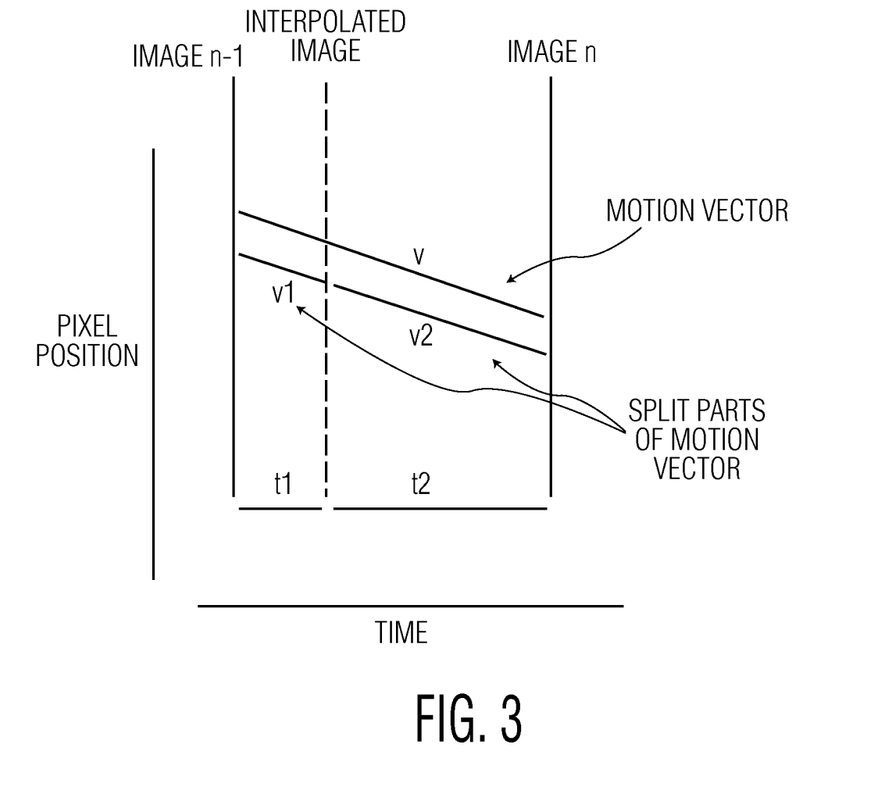
FIG. 3 illustrates a technique for implementing motion compensated temporal interpolation that can be used in the motion compensated temporal interpolator of FIG. 1.

FIG. 3 illustrates a technique for implementing motion compensated temporal interpolation that can be used in the motion compensated temporal interpolator 104 of FIG. 1. The motion compensated temporal interpolator performs motion compensated temporal interpolation on the input image "n−1" and the input image "n" using a motion vector "v" and create an interpolated image at a temporal position between the input image "n−1" and the input image "n." The motion vector "v" is split into two split parts, "v1" and "v2" according to temporal distances "t1" and "t2" between the interpolated image and the input images "n−1" and "n," respectively. A group of pixels of the interpolated image is constructed as follows. First, a group of pixels of the input image "n−1" and a group of pixels of the input image "n" are fetched over the split parts "v1" and "v2" of the motion vector "v," respectively. Then, the fetched pixels are utilized to construct the group of pixels of the interpolated image. The process of motion compensated temporal image interpolation is repeated for each group of pixels of the interpolated image.

In some embodiments, the motion compensated temporal interpolator 104 determines a spatial resolution for both the input image "n−1" and the input image "n" using the motion vector "v." As long as an object moves with constant speed, pixels representing the object are always interpolated with the same resolution. If pixels are available in multiple resolutions, fading between the adjacent resolutions is possible.

In some embodiments, the motion compensated temporal interpolator 104 independently determines a spatial resolution for each of the input images "n−1" and "n." For example, the motion compensated temporal interpolator may determine a spatial resolution for the input image "n−1" using the split part "v1" of the motion vector "v" and another spatial resolution for the input image "n" using the split part "v2" of the motion vector "v." When an object moves from the input image "n−1" to the input image "n" in temporal position, pixels representing the object are interpolated using varying resolutions over time.

Determining a spatial resolution for both the input image "n−1" and the input image "n" using the motion vector "v" results in stable temporal behavior. However, compared to independently determining a spatial resolution for each of the input images "n−1" and "n," determining a spatial resolution for both the input image "n−1" and the input image "n" using the motion vector "v" requires a larger cache. Although independently determining a spatial resolution for each of the input images "n−1" and "n" introduces flicker for high frequency image detail, independently determining a spatial resolution for each of the input images "n−1" and "n" allows a larger range of motion vectors. Additionally, independently determining a spatial resolution for each of the input images "n−1" and "n" allows a trade-off between flickering and image detail. If the resolutions of the input images "n−1" and "n" are not downscaled, the flickering has the same temporal frequency as the input frame rate. By downscaling and blurring the input images "n−1" and "n," the frequency of the flickering nearly doubles so that the flickering is less visible to the human eye and image detail is still mostly preserved.

Beside the temporal interpolation schemes described with respect to FIGS. 2 and 3, the motion compensated temporal interpolator 104 can utilize other temporal interpolation schemes to perform motion compensated temporal interpolation on the input images using the at least one motion vector generated by the motion estimator 102.

In an embodiment, the motion compensated temporal interpolator 104 compares at least one characteristic of at least one motion vector with an ordered list of thresholds and performs temporal interpolation on the input images in at least one spatial resolution that is determined by a relationship between the at least one characteristic of the at least one motion vector and the ordered list of thresholds. In particular, the motion compensated temporal interpolator performs temporal interpolation on the input images in a full spatial resolution when the at least one characteristic of the at least one motion vector is smaller than the smallest threshold of the ordered list of thresholds. Additionally, the frame rate conversion system downscales the input images from the full spatial resolution into a downscaled spatial resolution when the at least one characteristic of the at least one motion vector is larger than the smallest threshold of the ordered list of thresholds, and performs temporal interpolation on the input images in the downscaled spatial resolution. In an embodiment, the downscaled spatial resolution is decreasing when the at least one characteristic of the at least one motion vector is increasing and the downscaled spatial resolution is increasing when the at least one characteristic of the at least one motion vector is decreasing. For example, the motion compensated temporal interpolator performs temporal interpolation on the input images on a full resolution when the at least one characteristic of the at least one motion vector is lower than or equal to a first threshold, perform temporal interpolation on the input images on a downscaled resolution when the at least one characteristic of the at least one motion vector is larger than the first threshold but lower than or equal to a second threshold, and perform temporal interpolation on the input images on a further downscaled resolution when the at least one characteristic of the at least one motion vector is larger than the second threshold but lower than or equal to a third threshold.

In another embodiment, the motion compensated temporal interpolator 104 performs motion compensated temporal interpolation on the input images in a full input resolution and a downscaled version only. In particular, the motion compensated temporal interpolator compares at least one characteristic of at least one motion vector with a single threshold and performs temporal interpolation on the input images in a full spatial resolution when the at least one characteristic of the at least one motion vector is smaller than the threshold. Additionally, the frame rate conversion system downscales the input images from the full spatial resolution into a downscaled spatial resolution when the at least one characteristic of the at least one motion vector is larger than the threshold and performs temporal interpolation on the input images in the downscaled spatial resolution. The downscaled spatial resolution may be fixed.

In some embodiments, the motion compensated temporal interpolator 104 operates differently when at least one characteristic of at least one motion vector is larger than or equal to a certain threshold and when the at least one characteristic of at least one motion vector is smaller than the threshold. In some embodiments, the motion compensated temporal interpolator operates differently when the relationship between a function of at least one characteristic of at least one motion vector and a threshold changes. For example, the function of the at least one characteristic of the at least one motion vector may be a polynomial function of the at least one characteristic of the at least one motion vector.

In an embodiment, the motion compensated temporal interpolator 104 is configured to selectively perform temporal interpolation on the input images in a single spatial resolution that is determined by at least one characteristic of at least one motion vector generated by the motion estimator 102.

In another embodiment, the motion compensated temporal interpolator 104 is configured to perform temporal interpolation on the input images in multiple spatial resolutions that are determined by at least one characteristic of at least one motion vector respectively to generate multiple interpolated images. The frame rate conversion system is further configured to upscale an interpolated image generated by performing temporal interpolation on the input images in a spatial resolution that is lower than a full spatial resolution into a processed image and to combine the interpolated images and the processed image to produce an output image. For example, the frame rate conversion system selects one of the interpolated images or the processed image as the output image based on the at least one characteristic of the at least one motion vector or add at least one of the interpolated images and the processed image to generate the output image.

Figure 4:
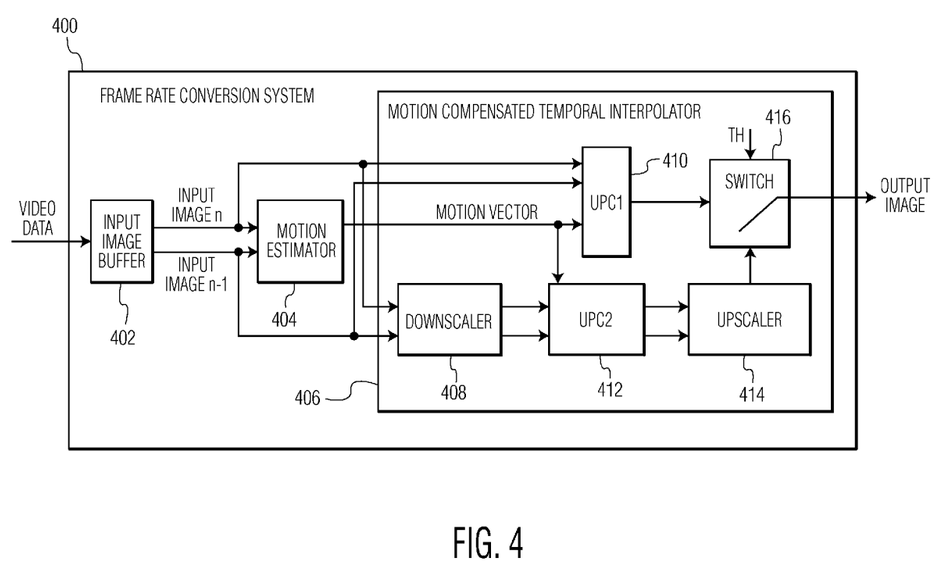
FIG. 4 depicts an embodiment of the frame rate conversion system of FIG. 1.

FIG. 4 depicts an embodiment of the frame rate conversion system 100 of FIG. 1. As depicted in FIG. 4, the frame rate conversion system 400 includes an input image buffer 402, a motion estimator 404, and a motion compensated temporal interpolator 406.

In the embodiment of FIG. 4, the input image buffer 402 is configured to buffer video data and to reconstruct images from the video data. The motion estimator 404 is configured to perform motion estimation between an input image "n−1" and an input image "n" to generate at least one motion vector. The input image "n−1" may be a previous input image and the input image "n" may be a current input image.

In the embodiment of FIG. 4, the motion compensated temporal interpolator 406 includes a downscaler 408, two upconverters ("UPC1" 410 and "UPC 2" 412), an upscaler 414, and a switch 416. The motion compensated temporal interpolator is configured to perform motion compensated temporal interpolation on the input image "n−1" and the input image "n" using the at least one motion vector to generate at least one interpolated image.

In the embodiment of FIG. 4, the upconverter "UPC 1" 410 is configured to perform temporal interpolation on the input image "n−1" and the input image "n" in a full spatial resolution using the at least one motion vector to generate an interpolated image. The downscaler 408 is configured to downscale the input image "n−1" and the input image "n" from the full spatial resolution into a downscaled spatial resolution. In some embodiments, the downscaled spatial resolution is fixed. The upconverter "UPC 2" 412 is configured to perform temporal interpolation on the input image "n−1" and the input image "n" in the downscaled spatial resolution using the at least one motion vector to generate an interpolated image. The upscaler 414 is configured to upscale the interpolated image generated by the upconverter "UPC 2" into a processed image. In some embodiments, the processed image has a full spatial resolution. The switch 416 is configured to select the interpolated image from the upconverter "UPC 1" or the processed image from the upscaler as an output image based on at least one characteristic of the at least one motion vector. In particular, the switch is configured to select the interpolated image from the upconverter "UPC 1" to form the output image when the at least one characteristic of the at least one motion vector does not exceed a threshold (TH) and to select the processed image from the upscaler to form the output image when the at least one characteristic of the at least one motion vector exceeds the threshold (TH).

For example, the output image, the interpolated image from the upconverter "UPC 1" 410, and the processed image from the upscaler 414, may satisfy the equations:

$$I_{out} = I_{interpolatedUPC1} \text{ when } R \leq TH \quad (1)$$

$$I_{out} = I_{processed} \text{ when } R > TH \quad (2)$$

where $I_{out}$ represents the output image, $I_{interpolatedUPC1}$ represents the interpolated image from the upconverter "UPC 1," $I_{processed}$ represents the processed image from the upscaler, and R represents the at least one characteristic of the at least one motion vector, such as the vertical range of a motion vector. When R does not exceed the threshold (TH), $I_{out}$ is equal to $I_{interpolatedUPC1}$ and when R exceeds the threshold (TH), $I_{out}$ is equal to $I_{processed}$.

An example of the operation of the frame rate conversion system 400 of FIG. 4 is described as follows. At the input image buffer 402, video data is buffered and an input image "n−1" and an input image "n" are reconstructed and transferred to the motion estimator 404. At the motion estimator, motion estimation on the input image "n−1" and the input image "n" is performed and at least one motion vector is produced. At the upconverter "UPC 1" 410, temporal interpolation on the input image "n−1" and the input image "n" in a full spatial resolution is performed using the at least one motion vector and an interpolated image is generated. At the downscaler 408, the input image "n−1" and the input image "n" is downscaled from the full spatial resolution into a downscaled spatial resolution. At the upconverter "UPC 2" 412, temporal interpolation on the input image "n−1" and the input image "n" is performed in the downscaled spatial resolution using the at least one motion vector to generate an interpolated image. At the upscaler 414, the interpolated image generated by the upconverter "UPC 2" is upscaled into a processed image. At the switch 416, the interpolated image from the upconverter "UPC 1" is selected as an output image when the at least one vertical range of the at least one motion vector does not exceed the threshold (TH) and the processed image from the upscaler is selected as the output image when the at least one vertical range of the at least one motion vector exceeds the threshold (TH).

Figure 5:
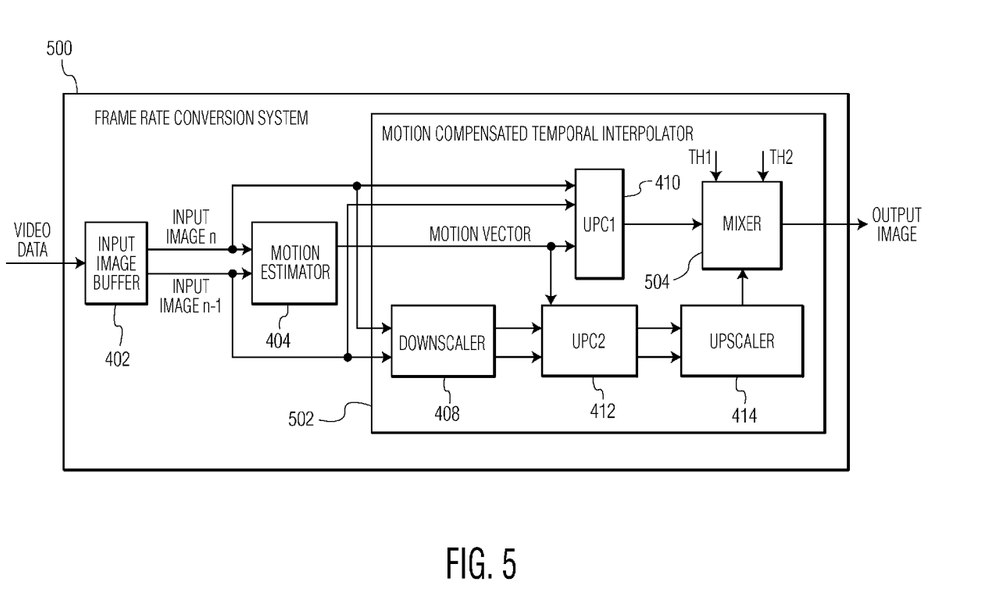
FIG. 5 depicts another embodiment of the frame rate conversion system of FIG. 1.

FIG. 5 depicts another embodiment of the frame rate conversion system 100 of FIG. 1. As depicted in FIG. 5, the frame rate conversion system 500 includes an input image buffer 402, a motion estimator 404, and a motion compensated temporal interpolator 502. The embodiment of FIG. 5 is similar to the embodiment of FIG. 4, except that the motion compensated temporal interpolator in the embodiment of FIG. 5 includes a mixer 504, instead of the switch 416 as in the motion compensated temporal interpolator 406 in the embodiment of FIG. 4. Thus, the above description with respect to the embodiment of FIG. 4 applies to the embodiment of FIG. 5, except the description with respect to the switch.

In the embodiment of FIG. 5, the mixer 504 is configured to process the interpolated image from the upconverter "UPC 1" 410 and the processed image from the upscaler 414 to generate an output image based on the range of the at least one motion vector. In particular, the mixer is configured to select the interpolated image from the upconverter "UPC 1" to form the output image when the range of the at least one motion vector does not exceed a first threshold (TH1), to mix the interpolated image from the upconverter "UPC 1" and the processed image from the upscaler to generate the output image when at least one characteristic of at least one motion vector exceeds the first threshold (TH1) but does not exceed a second threshold (TH2), and to select the processed image from the upscaler to form the output image when the at least one characteristic of the at least one motion vector exceeds the second threshold (TH2).

For example, the output image, the interpolated image from the upconverter "UPC 1" 410, and the processed image from the upscaler 414, may satisfy the equations:

$$I_{out} = I_{interpolatedUPC1} \text{ when } R \leq TH1 \quad (3)$$

$$I_{out} = \alpha \times I_{processed} + \beta \times I_{interpolatedUPC1} \text{ when } TH1 < R \leq TH2 \quad (4)$$

$$I_{out} = I_{processed} \text{ when } R > TH2 \quad (5)$$

where $I_{out}$ represents the output image, $I_{interpolatedUPC1}$ represents the interpolated image from the upconverter "UPC 1," $I_{processed}$ represents the processed image from the upscaler, $\alpha$ and $\beta$ represent weight factors, and R represents the at least one characteristic of the at least one motion vector, such as the vertical range of a motion vector. In an embodiment, the sum of weight factors $\alpha$ and $\beta$ is one. When R does not exceed the first threshold (TH1), $I_{out}$ is equal to $I_{interpolatedUPC1}$, when R exceeds the first threshold (TH1) but does not exceed the second threshold (TH2), $I_{out}$ is equal to the weighted addition of $I_{interpolatedUPC1}$ and $I_{processed}$, and when R exceeds the second threshold (TH2), $I_{out}$ is equal to $I_{processed}$.

An example of the operation of the frame rate conversion system 500 of FIG. 5 is described as follows. At the input image buffer 402, video data is buffered and an input image "n−1" and an input image "n" are reconstructed and transferred to the motion estimator 404. At the motion estimator, motion estimation on the input image "n−1" and the input image "n" is performed and at least one motion vector is produced. At the upconverter "UPC 1" 410, temporal interpolation is performed on the input image "n−1" and the input image "n" in a full spatial resolution using the at least one motion vector and an interpolated image is generated. At the downscaler 408, the input image "n−1" and the input image "n" are downscaled from the full spatial resolution into a downscaled spatial resolution. At the upconverter "UPC 2" 412, temporal interpolation is performed on the input image "n−1" and the input image "n" in the downscaled spatial resolution using the at least one motion vector to generate an interpolated image. At the upscaler 414, the interpolated image generated by the upconverter "UPC 2" is upscaled into a processed image. At the mixer 504, the interpolated image from the upconverter "UPC 1" is selected to form the output image when the at least one vertical range of the at least one motion vector does not exceed the first threshold (TH1), the interpolated image from the upconverter "UPC 1" and the processed image from the upscaler are mixed to generate the output image when the at least one vertical range of the at least one motion vector exceeds the first threshold (TH1) but does not exceed the second threshold (TH2), and the processed image from the upscaler is selected to form the output image when the range of the at least one motion vector exceeds the second threshold (TH2).

Figure 6:
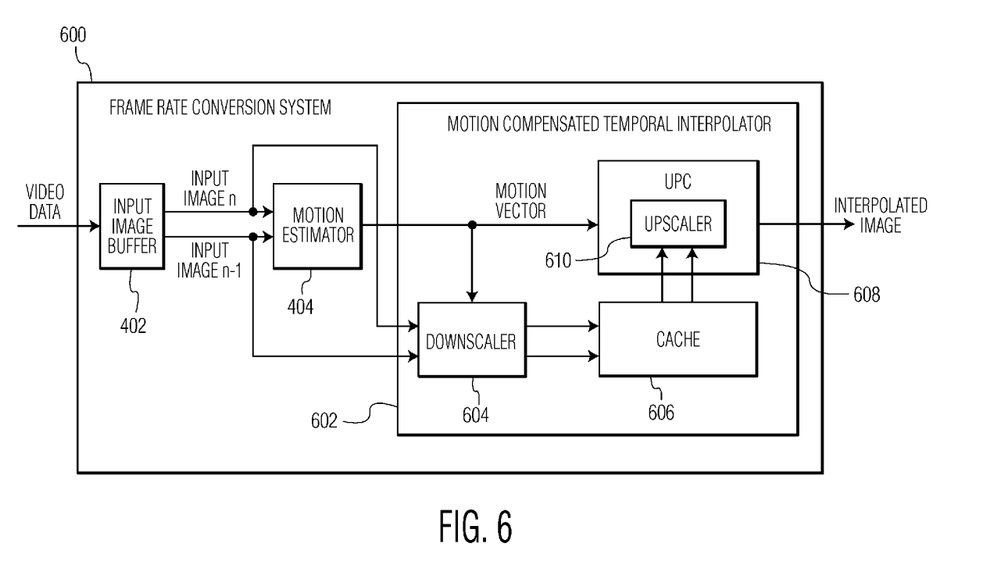
FIG. 6 depicts another embodiment of the frame rate conversion system of FIG. 1.

FIG. 6 depicts another embodiment of the frame rate conversion system 100 of FIG. 1. As depicted in FIG. 6, the frame rate conversion system 600 includes an input image buffer 402, a motion estimator 404, and a motion compensated temporal interpolator 602.

In the embodiment of FIG. 6, the motion compensated temporal interpolator 602 includes a downscaler 604, a cache 606, and an upconverter ("UPC" 608) that includes an upscaler 610. The motion compensated temporal interpolator is configured to perform motion compensated temporal interpolation on the input image "n−1" and the input image "n" using the at least one motion vector to generate at least one interpolated image.

The downscaler 604 is configured to downscale the input image "n-1" and the input image "n" from a full spatial resolution into a downscaled spatial resolution that is determined by at least one characteristic of the at least one motion vector. In some embodiments, the downscaled spatial resolution is fixed. The cache 606 is configured to temporarily store the input image "n−1" and the input image "n" in the downscaled spatial resolution. The upscaler 610 is configured to upscale the input image "n−1" and the input image "n" that are temporarily stored in the cache from the downscaled spatial resolution into the full spatial resolution based on the at least one characteristic of the motion vector. The upconverter "UPC" 608 is configured to perform temporal interpolation on the input image "n−1" and the input image "n" in the full spatial resolution using the at least one motion vector to generate at least one interpolated image.

Because low resolution input images occupy less space in the cache 606 than full resolution input images, the frame rate conversion system 600 can either increase the maximal motion vector that can be stored in a given cache or decrease the cache size that is required to store a given motion vector.

An example of the operation of the frame rate conversion system 600 of FIG. 6 is described as follows. At the input image buffer 402, video data is buffered and an input image "n−1" and an input image "n" are reconstructed and transferred to the motion estimator 404. At the motion estimator, motion estimation on the input image "n−1" and the input image "n" is performed and at least one motion vector is produced. At the downscaler 604, the input image "n-1" and the input image "n" is downscaled from a full spatial resolution into a downscaled spatial resolution that is determined by at least one characteristic of the at least one motion vector. At the cache 606, the input image "n−1" and the input image "n" in the downscaled spatial resolution are temporarily stored. At the upscaler 610, the input image "n−1" and the input image "n" that are temporarily stored in the cache are upscaled from the downscaled spatial resolution into the full spatial resolution based on the at least one characteristic of the motion vector. At the upconverter "UPC" 608, temporal interpolation is performed on the input image "n−1" and the input image "n" in the full spatial resolution using the at least one motion vector to generate at least one interpolated image.

Figure 7:
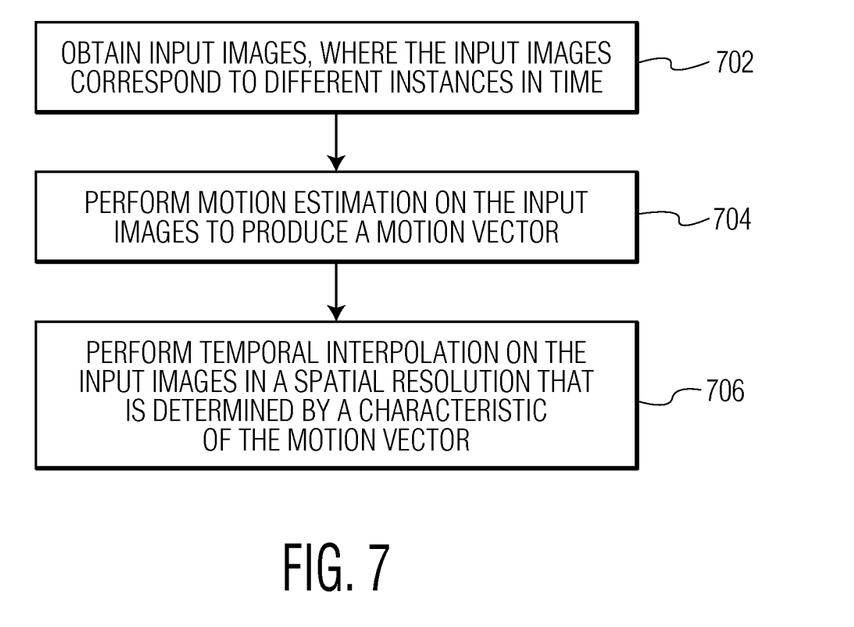
FIG. 7 is a process flow diagram of a method for frame rate conversion using multi-resolution temporal interpolation in accordance with an embodiment of the invention.

FIG. 7 is a process flow diagram of a method for frame rate conversion using multi-resolution temporal interpolation in accordance with an embodiment of the invention. At block 702, input images are obtained, where the input images correspond to different instances in time. At block 704, motion estimation is performed on the input images to produce a motion vector. At block 706, temporal interpolation is performed on the input images in a spatial resolution that is determined by a characteristic of the motion vector to generate an interpolated image.

The various components or units of the embodiments that have been described or depicted may be implemented in software that is stored in a computer readable medium, hardware, firmware, or a combination of software that is stored in a computer readable medium, hardware, and firmware.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for frame rate conversion, the method comprising:
   obtaining input images, wherein the input images correspond to different instances in time;
   performing motion estimation on the input images to produce a motion vector; and
   performing temporal interpolation on the input images in a spatial resolution that is determined by a characteristic of the motion vector to generate an interpolated image, wherein performing the temporal interpolation comprises:
      comparing the characteristic of the motion vector with an ordered list of thresholds; and
      performing the temporal interpolation on the input images in a spatial resolution that is determined by a relationship between the characteristic of the motion vector and the ordered list of thresholds.

2. The method of claim 1, wherein the characteristic of the motion vector comprises a vertical range of the motion vector.

3. The method of claim 1, wherein performing the temporal interpolation on the input images in a spatial resolution that is determined by a relationship between the characteristic of the motion vector and the ordered list of thresholds comprises performing the temporal interpolation on the input images in a full spatial resolution when the characteristic of the motion vector is smaller than the smallest threshold of the ordered list of thresholds.

4. The method of claim 3, wherein performing the temporal interpolation on the input images in a spatial resolution that is determined by a relationship between the characteristic of the motion vector and the ordered list of thresholds further comprises:
   downscaling the input images from the full spatial resolution into a downscaled spatial resolution when the characteristic of the motion vector is larger than the smallest threshold of the ordered list of thresholds; and
   performing the temporal interpolation on the input images in the downscaled spatial resolution.

5. The method of claim 4, wherein the downscaled spatial resolution is decreasing when the characteristic of the motion vector is increasing and the downscaled spatial resolution is increasing when the characteristic of the motion vector is decreasing.

6. The method of claim 1, wherein performing the temporal interpolation comprises:
   comparing the characteristic of the motion vector with a single threshold; and
   performing the temporal interpolation on the input images in a full spatial resolution when the characteristic of the motion vector is smaller than the threshold.

7. The method of claim 6, wherein performing the temporal interpolation further comprises:
   downscaling the input images from the full spatial resolution into a downscaled spatial resolution when the characteristic of the motion vector is larger than the threshold; and
   performing the temporal interpolation on the input images in the downscaled spatial resolution.

8. The method of claim 7, wherein the downscaled spatial resolution is fixed.

9. The method of claim 1, wherein performing the temporal interpolation comprises performing the temporal interpolation on the input images in a plurality of spatial resolutions to generate a plurality of interpolated images.

10. The method of claim 9 further comprising upscaling an interpolated image generated by performing the temporal interpolation on the input images in a spatial resolution that is lower than a full spatial resolution into a processed image.

11. The method of claim 10 further comprising combining the interpolated images and the processed image to produce an output image.

12. The method of claim 11, wherein combining the interpolated images and the processed image comprises selecting one of the interpolated images or the processed image as the output image based on the range of the motion vector.

13. The method of claim 11, wherein combining the interpolated images and the processed image comprises performing a weighted addition on at least one of the interpolated images and the processed image to generate the output image.

14. The method of claim 1 further comprising independently determining a spatial resolution for each of the input images, wherein performing the temporal interpolation comprises performing the temporal interpolation on the input images in determined spatial resolutions.

15. The method of claim 14, wherein independently determining a spatial resolution for each of the input images comprises:
   splitting the motion vector into split parts, wherein each of the split parts corresponds to one of the input images; and
   determining a spatial resolution for each of the input images on the split part of the motion vector corresponding to the input image.

16. A system for frame rate conversion, the system comprising:
   a motion estimator configured to perform motion estimation on input images to generate a motion vector, wherein the input images correspond to different instances in time; and
   a motion compensated temporal interpolator configured to perform motion compensated temporal interpolation on the input images using the motion vector to generate interpolated images, wherein the motion compensated temporal interpolator comprises:
      a first upconverter configured to perform temporal interpolation on the input images in a full spatial resolution using the motion vector to generate a first interpolated image;
      a downscaler configured to downscale the input images from the full spatial resolution into a downscaled spatial resolution;
      a second upconverter configured to perform temporal interpolation on the input images in the downscaled spatial resolution using the motion vector to generate a second interpolated image;
      an upscaler configured to upscale the second interpolated image into a processed image; and
      a switch configured to select the first interpolated image or the processed image as an output image based on a characteristic of the motion vector.

17. The system of claim 16, wherein the output image, the first interpolated image, and the processed image satisfy the equations:

$$I_{out} = I_{InterpolatedUPC1} \text{ when } R \leq TH$$

$I_{out}=I_{processed}$ when $R>TH$ where $I_{out}$ represents the output image, $I_{interpolatedUPC1}$ represents the first interpolated image, $I_{processed}$ represents the processed image, R represents the characteristic of the motion vector, and TH represents a threshold.

18. A system for frame rate conversion, the system comprising:
a motion estimator configured to perform motion estimation on input images to generate a motion vector, wherein the input images correspond to different instances in time; and
a motion compensated temporal interpolator configured to perform motion compensated temporal interpolation on the input images using the motion vector to generate interpolated images, wherein the motion compensated temporal interpolator comprises:
  a first upconverter configured to perform temporal interpolation on the input images in a full spatial resolution using the motion vector to generate a first interpolated image;
  a downscaler configured to downscale the input images from the full spatial resolution into a downscaled spatial resolution;
  a second upconverter configured to perform temporal interpolation on the input images in the downscaled spatial resolution using the motion vector to generate a second interpolated image;
  an upscaler configured to upscale the second interpolated image into a processed image; and
  a mixer configured to process the first interpolated image and the processed image to generate an output image based on a characteristic of the motion vector.

19. The system of claim 18, wherein the output image, the first interpolated image, and the processed image satisfy the equations:

$I_{out}=I_{interpolatedUPC1}$ when $R \leq TH1$ $I_{out}=\alpha \times I_{processed}+\beta \times I_{interpolatedUPC1}$ when $TH1 < R \leq TH2$ $I_{out}=I_{processed}$ when $R>TH2$ where $I_{out}$ represents the output image, $I_{interpolatedUPC1}$ represents the first interpolated image, $I_{processed}$ represents the processed image, R represents the characteristic of the at least one motion vector, $\alpha$ and $\beta$ represent weight factors, TH1 represents a first threshold, and TH2 represents a second threshold.

* * * * *